United States Patent [19]
Borda

[11] Patent Number: 5,538,376
[45] Date of Patent: Jul. 23, 1996

[54] APPARATUS AND METHOD FOR SECURING LARGE OBJECTS

[75] Inventor: William Borda, US 62 & 7667 Eagles Rest Farm, South Dayton, N.Y. 14138

[73] Assignees: William Borda; Ann Borda, both of South Dayton, N.Y.

[21] Appl. No.: 204,880

[22] Filed: Mar. 2, 1994

[51] Int. Cl.$^6$ .............................. B60P 7/08; B61D 45/00
[52] U.S. Cl. .............................. 410/99; 410/98; 410/48; 410/50; 410/100
[58] Field of Search ................................. 410/41, 41–50, 410/96–100, 155; 206/453, 586; 248/499, 500, 503; 24/115 K, 68 CT; 105/362

[56] References Cited

U.S. PATENT DOCUMENTS

| | | | |
|---|---|---|---|
| 2,772,064 | 11/1956 | Cole | 410/99 X |
| 3,193,122 | 7/1965 | Sauthoff | 410/98 X |
| 3,378,889 | 4/1968 | Dunderdale | 410/99 |
| 3,875,617 | 4/1975 | Cline | 410/47 |
| 4,211,389 | 7/1980 | Frey et al. | 24/68 CT X |
| 4,487,537 | 12/1984 | Morse | 410/47 |
| 4,503,978 | 3/1985 | Smit et al. . | |
| 5,234,298 | 8/1993 | Shuker | 410/98 |
| 5,340,250 | 8/1994 | Meriwether et al. | 206/453 X |

OTHER PUBLICATIONS

Department of Transportation, Sec. 393.100(3), Coils.

*Primary Examiner*—David A. Bucci
*Assistant Examiner*—Stephen Gordon
*Attorney, Agent, or Firm*—Jaeckle, Fleischmann & Mugel

[57] ABSTRACT

A device for securing an object to a surface includes a pair of brackets, with each of the brackets having an elongated member with a pair of pivotally mounted cleats attached to the elongated member at opposing ends. Each of the cleats has a first U-shaped passage. To secure an object, the brackets are seated on substantially opposing sides of the object with each of the cleats pivoting to adjust to the contour of the object. A first restraining element passes through the first passage in one cleat for each bracket and a second restraining element passes through the first passage in the other cleat for each bracket. The ends of said first and second restraining elements are secured to the surface, thus securing the object to the surface. A method for securing an object to a surface using the apparatus of the invention is also provided.

8 Claims, 4 Drawing Sheets

APPARATUS AND METHOD FOR SECURING LARGE OBJECTS

FIELD OF THE INVENTION

This invention relates generally to devices for securing objects to a surface, and more particularly to a device for securing a large object, such as a steel coil, onto the bed of a truck.

BACKGROUND OF THE INVENTION

The trucking industry is an integral part of commerce in the United States. Each day thousands of trucks transport goods across town and across the country. The types of goods which are transported varies dramatically. Most goods can be transported with relative ease and safety, however others are particularly dangerous and problematic.

In particular, the transport of large steel coils on flat bed trucks has proven to be very hazardous. On a number of occasions, steel coils have become dislodged from the backs of trucks and have caused deadly accidents.

Currently, the transport of steel coils is regulated by the Department of Transportation ("DOT"). Specifically, DOT Sec. 393.100 sets forth the requirement for the transport of objects on trucks. However, the DOT regulations have had limited success in minimizing or eliminating accidents.

A number of devices have been developed or suggested to solve the problem. For example, a support for cylindrical objects, such as the one disclosed in U.S. Pat. No. 4,503,978 to Smit, et al., has been used in the transport of steel coils. However, even with these supports, accidents have happened.

Others have suggested the use of additional chains to secure the cargo, but these chains are expensive and time consuming to install and often slip out of place. Additionally, chains passed over the top of an object do not prevent the objects from swaying, particularly when the vehicle carrying the object takes a sharp turn. As a result, the vehicles which are transporting them are unstable and unsafe on the roads.

Still others have suggested requiring trucks which carry steel coils to have flatbeds with depressions already in them. However, the use of such trucks, like the support in U.S. Pat. No. 4,503,978, would probably have limited success. Additionally, these trucks would be prohibitively expensive because of their limited utility for carrying other loads.

The problem of transporting objects is not limited to the trucking industry. Securing objects on other modes of transportation, such as rail cars is also a concern. Objects can become dislodged during transport causing injuries and deaths and also damaging the objects.

Additionally, the safe storage of objects in warehouses and stores is also a problem. Objects in warehouses and stores are occasionally knocked over when they are not securely fastened, again causing injury and death and damaging the object itself.

It is a general object of the invention to provide an improved device for securing objects to a surface during storage or transport.

It is another object of the invention to provide a device for securing objects, such as steel coils, onto flatbed trucks.

SUMMARY OF THE INVENTION

According to the present invention, these and other objects and advantages are achieved in a device and method for securing an object to a surface. The device includes a pair of brackets, with each of the brackets having an elongated member with a pair of pivotally mounted cleats attached to the elongated member at opposing ends. Each of the cleats has a first passage. To secure an object, the brackets are seated on substantially opposing sides of the object with each of the cleats pivoting to adjust to the contour of the object. A first restraining element passes through the first passage in one cleat for each bracket and a second restraining element passes through the first passage in the other cleat for each bracket. The ends of said first and second restraining elements are secured to the surface, thus securing the object to the surface.

The securing device has a number of advantages. With the device, objects secured to the surface, such as a steel coil on a flatbed truck, will not dislodge or even sway during sharp movements. The truck will tip over before the object will touch the ground. The securing device is easy to use and can be installed in a manner of minutes. Additionally, the securing device will not slip out of place. Specifically designed trucks for transporting different goods are unnecessary because the device can be used on any type of truck.

According to one aspect of the invention, objects can be secured to a surface for storage or transport.

According to another aspect of the invention, steel coils can be secured to a flatbed truck for transportation.

BRIEF DESCRIPTION OF THE DRAWINGS

For a better understanding of the present invention, together with other and further objects, advantages and capabilities thereof, reference is made to the accompanying drawings, which are incorporated herein by reference in which.

DETAILED DESCRIPTION OF THE INVENTION

Figure 1:
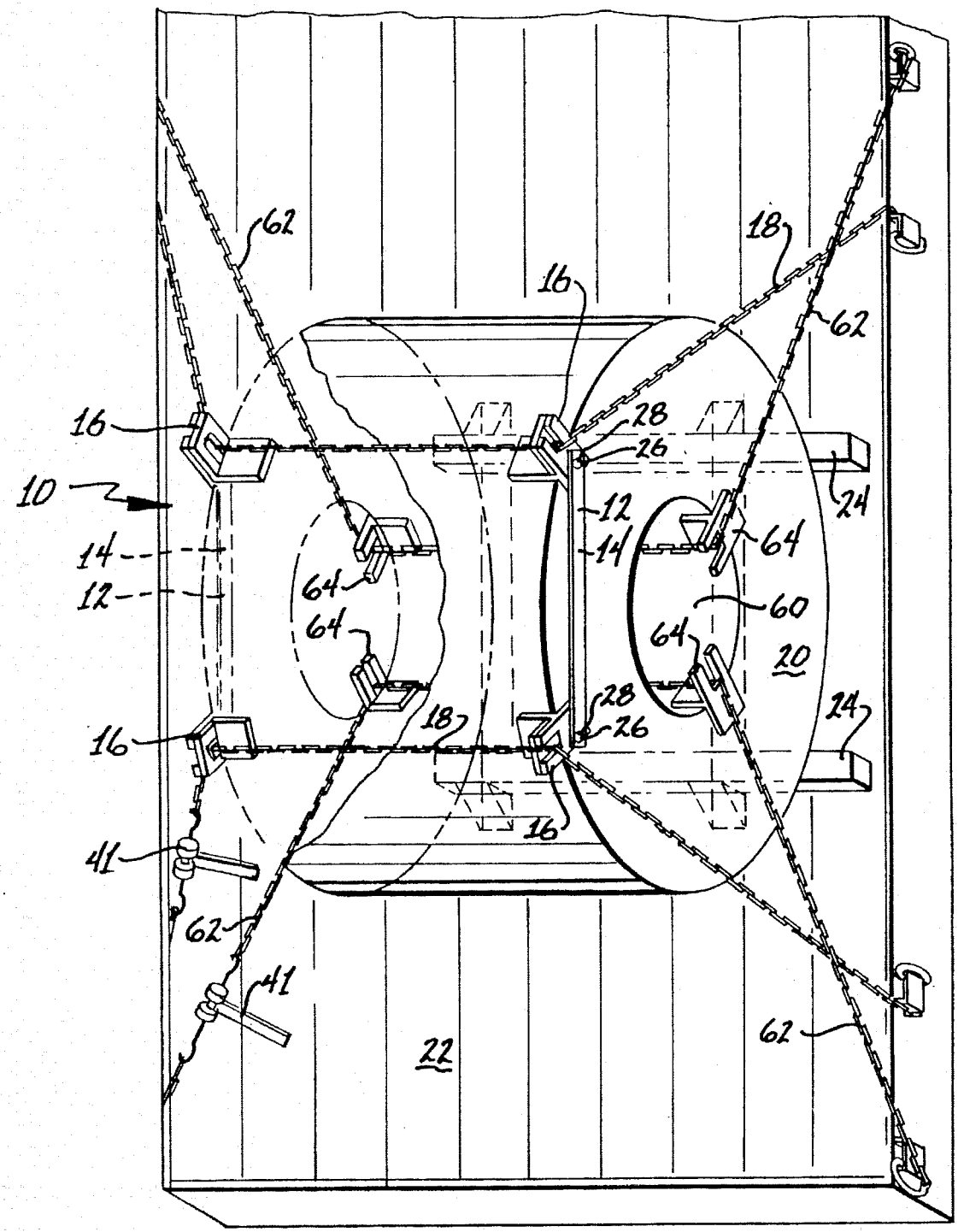
FIG. 1 is a top perspective view of a securing device in accordance with the present invention on a truck.
Figure 2:
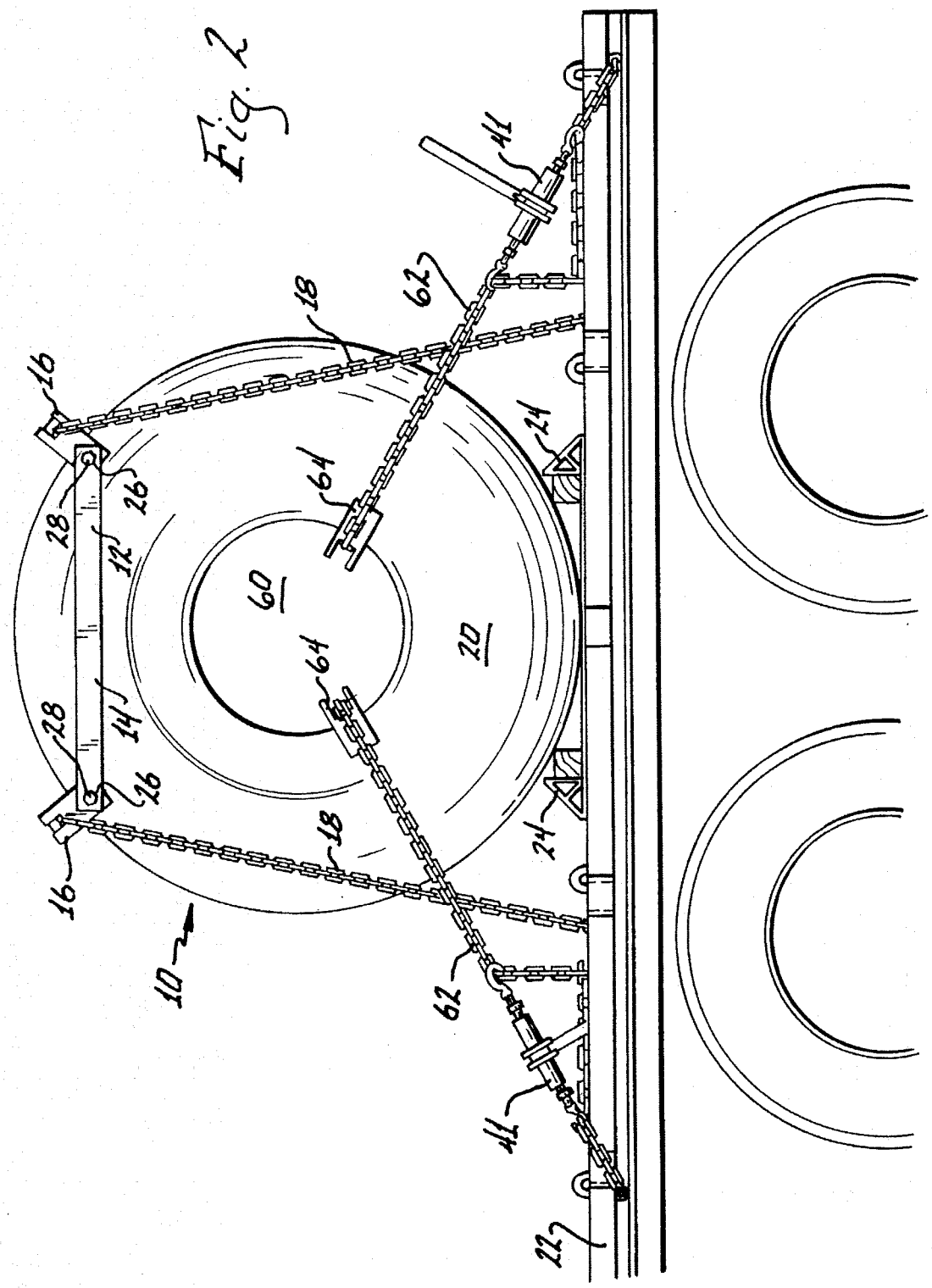
FIG. 2 is a side perspective view of the securing device on the truck.

A securing device 10 in accordance with the present invention is illustrated in FIGS. 1–2. The securing device 10 includes a pair of brackets 12, with each bracket 12 comprising an elongated member 14 with a pair of pivotally mounted cleats 16 at opposing ends. The brackets 12 are placed on an object 20 to be secured and restraining elements 18 are passed through the cleats 16 on the brackets 12 to secure the object 20 to a surface 22. The securing device 10 is used to secure the large object 20 to the surface 22 for storage or transportation and is particularly useful for securing steel coils to flatbed trucks. The securing device 10 is easy to use and is relatively inexpensive compared to existing and proposed alternatives for securing objects discussed in the background.

Referring to FIGS. 1 and 2, one embodiment of the securing device 10 is illustrated. In this example, the object 20 is a cylindrical roll of steel coil which is seated on an optional support 24, such as that disclosed in U.S. Pat. No.

4,503,978 to Smit, et al., and incorporated herein by reference. Although a roll of steel coil is shown, other objects 20 can be secured by the device 10. The support 24 with the object 20 rests upon a surface 22, which in this example is a flatbed truck. Because the features of a truck are generally known, the description which follows is directed in particular only to the elements forming part of the truck cooperating directly with the disclosed embodiment. It is to be understood, however, that other elements may take various forms known to a person of ordinary skill in the art.

The securing device 10 has a pair of brackets 12. Each bracket 12 comprises an elongated member 14 with a pair of holes 26 drilled at opposing ends of each member 14. Each hole 26 is large enough to allow a bolt 28 or other pivotally connecting device to pass through (also shown in FIG. 3). The members 14 may be constructed of steel or any other sufficiently rigid material. The members 14 may also be constructed to be extendible or retractable to adjust the length or can come in different lengths. The length of each member 14 will vary depending upon the size and shape of the object 20 to be secured. In this particular embodiment, each member 14 is approximately 38½" long and each hole 26 has approximately a 1" diameter.

Figure 3:
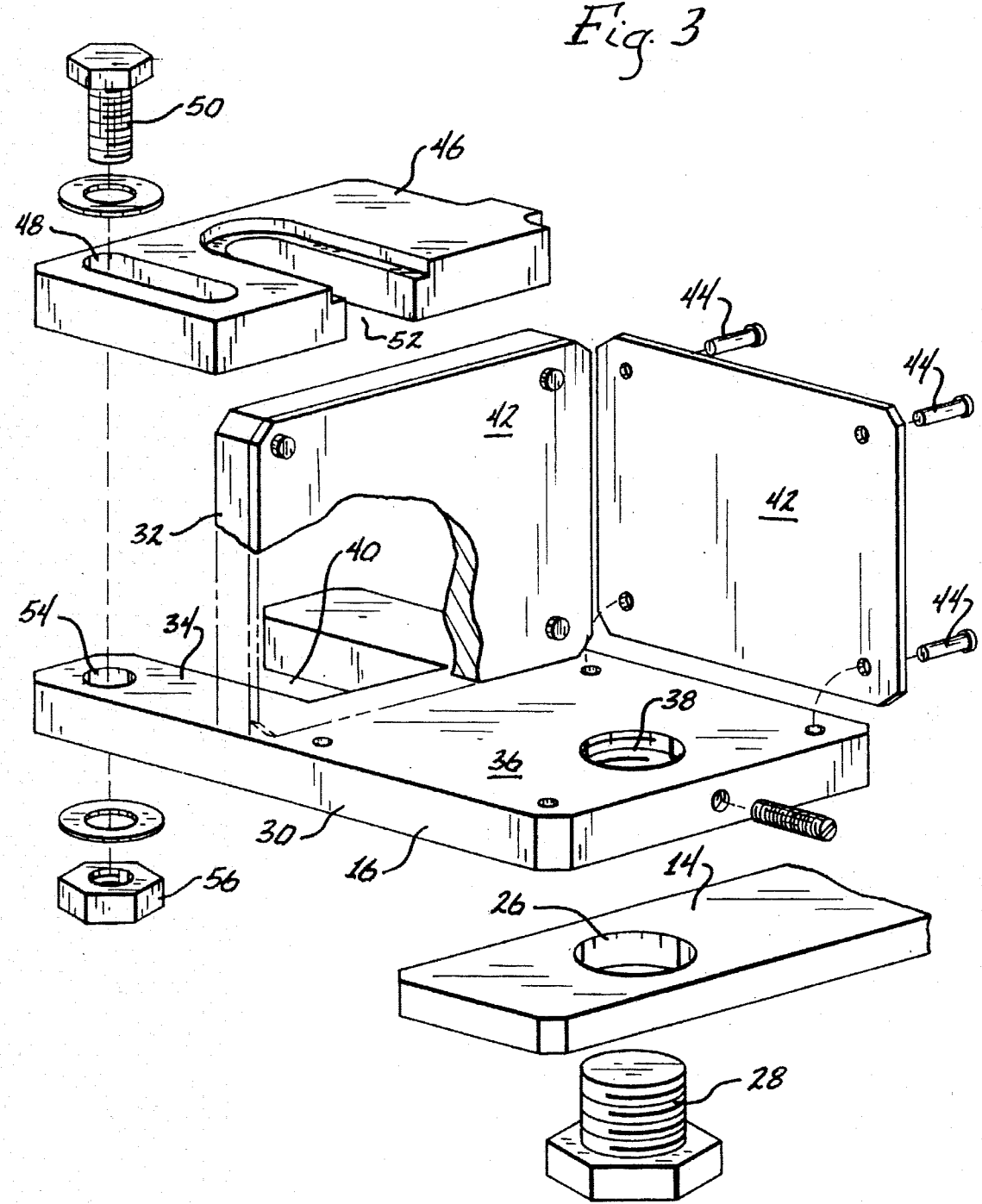
FIG. 3 is an exploded view of a cleat and a portion of the elongated member.

In FIG. 3, an exploded view of one of the cleats 16 is illustrated. In this particular embodiment, the cleat 16 has a substantially rectangular first portion 30 and a second portion 32 which is substantially square. The second portion 32 is secured along one edge to the first portion 30 so that the second portion 32 is substantially perpendicular to the first portion 30. The second portion 32 could also be pivotally connected to the first portion to enable the cleat 16 to adjust to the shape of the object to be secured. Additionally, instead of being formed from two separate pieces, the first and second portion 30 and 32 could be formed as one piece. The second portion 32 divides the first portion 30 into an upper and lower section 34 and 36. In this embodiment, the upper section 34 has a smaller overall surface area than the lower section 36. The dimensions of the cleat 16 can vary based on the particular type of object 20 to be secured. In this particular embodiment, the first portion 30 of the cleat is approximately 3" wide, 5" long and ⅝" thick and the second portion 32 is about 3" wide, 3" long and ½" thick. The cleat 16 can be made from a variety of materials, such as steel. Although, the cleat 16 in this example has one particular configuration, the cleat 16 could have other designs and shapes without departing from the invention.

The cleat 16 includes a hole 38 drilled through the lower section 36 of the first portion 30. The bolt 28 passes through one of the holes 26 in the bracket 12 and is threaded into the hole 38 in the lower section 36 in the first portion 30 to pivotally mount the cleat 16 to the member 14. A nut or pin (not shown) may be used on the opposite side of the bolt 28 to hold the bolt 28 in the holes 26 and 38. In this particular embodiment, the hole 38 is threaded and has a 1" diameter, although holes 38 which are not threaded and which have other dimensions could be used.

A passage 40 is provided in the upper section 34 of the first portion 30. The passage 40 must be large enough to allow a restraining element 18, such as a chain or rope, to pass through. A tightening device 41 may be included on each restraining element 18 to tighten the element 18, as shown in FIGS. 1 and 2. In this particular embodiment, the passage 40 has a substantially U-shape and is approximately 1" wide and 2" deep, although passages 40 with other shapes, such as square or triangular, and with other dimensions could be used.

The cleat 16 may also include an optional pad 42. The pad 42 may be secured to the lower section 36 of the first portion 30 and to the side of the second portion 32 facing the lower section 36. The pad 42 is secured to the first and second portions by rivets 44, although screws, bolts, glue, or any other type of attaching device could be used. In this particular embodiment, the pad 42 is made from rubber and is made in two pieces, although other padding material could be used, such as a soft plastic, and the pad 42 could be made from one piece. The area of the cleat 16 covered by the pad 42 rests against the object 20 and helps to protects the object 20 from damage.

The cleat 16 may also include an optional locking plate 46. The locking plate 46 includes a hole 48 through which a bolt 50 or other pivoting type of connecting device can pass through and a passage 52. The upper section 34 of the cleat 16 also includes a hole 54 through which the bolt 50 can pass to pivotally secure the locking plate to the upper section of the cleat. An optional nut 56 or pin (not shown) can be used to hold the bolt 50 in place. The hole 48 can be elongated to allow for easier adjustment of the locking plate 46. The passage 52 for the locking plate 46 must be large enough to fit over the restraining element 18 which passes through. In this particular embodiment, the passage 52 has a substantially U-shape, although the passage 52 could have other shapes, such as square or triangular. Preferably, the passage 52 for the locking plate 46 fits snugly over the restraining element 18. When the locking plate 46 is in place, the passage 52 for the locking plate 46 and the passage 40 on the upper section 34 define a narrower passage. In this particular embodiment, the passage 52 for the locking plate is 1" deep and ⅜" wide. The locking plate 46 can be made from steel or any other type of rigid material.

Figure 4:
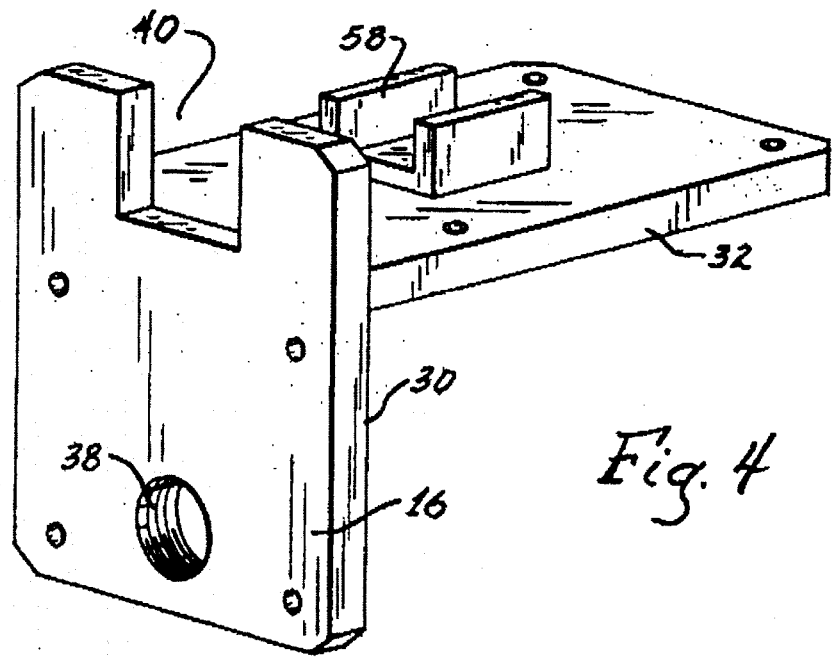
FIG. 4 is a perspective view of the cleat with an optional channel.

Referring to FIG. 4, the cleat 16 may also include an optional protective channel 58. The protective channel 58 is designed to receive the restraining element 18 as it passes through the passage 40 in the upper section 34. The base of the channel 58 is secured to the side of the second portion 32 facing the upper section 34 by glue or any other type of attaching device, such as screws or bolts. In this particular embodiment, the channel 58 is 1¾" long, ⅜" high and 1" wide, has a substantially U-shape and is made from plastic, although the channel 58 could have other dimensions, have different shapes and be made from other materials. The channel 58 protects the cleat 16 and the restraining element 18 from damage and acts as a guide for the restraining element 18 as it passes through.

The operation of the securing device 10 is illustrated in FIGS. 1 and 2. In this particular example, the object 20, a steel coil, is secured to the surface 22, a flatbed truck, with the securing device 10. Those skilled in the art will appreciate that the securing device 10 could be used to secure other types of objects, such as a triangularly-shaped object. To secure a triangularly-shaped object only a single bracket 12 with an elongated member 14 having a pair of pivotally mounted cleats 16 at opposing ends is necessary. The cleats 16 would pivot to rest upon the upper corner of the triangularly-shaped object holding elongated member 14 in place. One restraining element 18 would be passed through one cleat 16 and another restraining element 18 would be passed through the other cleat 16. The ends of the restraining elements 18 would be secured to the surface 22 to secure the triangularly-shaped object to the surface 22.

Before the securing device 10 is used to secure the object 20 shown in FIGS. 1 and 2, the object 20 in this example is placed into an optional support 24, like the one disclosed in U.S. Pat. No. 4,503,978 to Smit et al. in an upright position. In this particular example, the support 24 is positioned such that the eye 60 of the object 20 is substantially parallel to the side of the truck. However, the object 20 could be positioned at any angle, relative to the side of the surface 22, such as perpendicular.

Once the object 20 is in the support 24, chains 62 can optionally be passed through the eye 60 of the object 20 to secure it to the surface 22. In this example, two chains 62 are passed through and the ends of each chain 62 are secured to the surface 22. The ends of one chain 62 are secured to the surface 22 in front of the object 20 and the ends of the other chain 62 are secured to the surface 22 in back of the object 20. A detached cleat 64 may be positioned at each corner edge where the restraining element 62 engages the object 20 to protect the object 20 from damage. In this example, a tightening device 41 is included with each chain 62 to tighten each chain to secure the object 20 to the surface 22. Securing the ends of the lower chains 62 in opposing directions tensions the chains 62 against each other and helps to secure the object 20. The support 24 and the use of the lower chains 62 are not necessary for the securing device 10 to secure the object 20 to the surface 22, but are illustrated because they are required by DOT Sec. 393.100(c) Coils.

Although not shown, the cleats 64 on each side on the inner circumference of the steel coil could be pivotally connected to the ends of a member (not shown) to form a bracket, like cleats 16 connected to member 12. The cleats 64 connected by the member (not shown) would be pivoted to conform to the inner diameter of the steel coil, holding the member in place. A second similar member (not shown) with cleats 64 would be positioned on the opposing side of the inner circumference. One chain 62 would be passed through one cleat 64 for each bracket and another chain 62 would be passed through the other cleat 64 in each bracket. The ends of each chain 62 would be secured in opposing directions to the surface.

Next, the securing device 10 can be installed. The operator positions one of the brackets 12 near the top of the object 20 to be secured. The operator would select a bracket 12 of the appropriate length for the object 20 to be secured or would adjust the length of the member 14 to the object 20. The pivotally mounted cleats 16 on each bracket 12 adjust to the particular contour of the object 20 to be secured, in this case the circular shape of the steel coil. The lower section 36 of the first portion 30 and the side of the second portion 32 facing the lower section 36 engage the corner of the object 20. The weight of the bracket 12 keeps the bracket 12 in place on the object 20. Any padding 42 on the cleat 16 helps to protect the object 20 from damage and helps the bracket 12 grip the object 20.

Once the first bracket 12 is in place, the operator goes to the other side of the object 20 to install the other bracket 12. The operator places the bracket 12 across from the other bracket 12. Like the first bracket 12, the member 14 is selected for the proper length or adjusted to the proper length, the cleats 16 pivot to adjust to the contour of the object 20 and the weight of the bracket 12 holds the bracket 12 in place.

With both brackets 12 in place, the operator then obtains and passes a restraining element 18, in this case a chain through the passage 40 in one cleat 16 in each bracket 12. If the cleat 16 has a locking plate 46, the locking plate 46 is pivoted out of the way. The operator secures the ends of the chain 18 to the surface 22, in this case the bed of the truck. The operator then passes another chain 18 through the passage 40 in the remaining cleat 16 on each bracket 12, on the opposing side from the cleats 16 already engaged, and secures the ends of the chain 18 to the surface 22. Like the chains 62 passing through the eye 60 of the object 20, the ends of each chain 18 are secured in opposite directions. Securing the chains 18 in opposite directions tensions the chains 18 against each other to hold the object 20 in place. The operator then tightens each of the chains 18 with the tightening device 41 connected to each chain 18.

Figure 5:
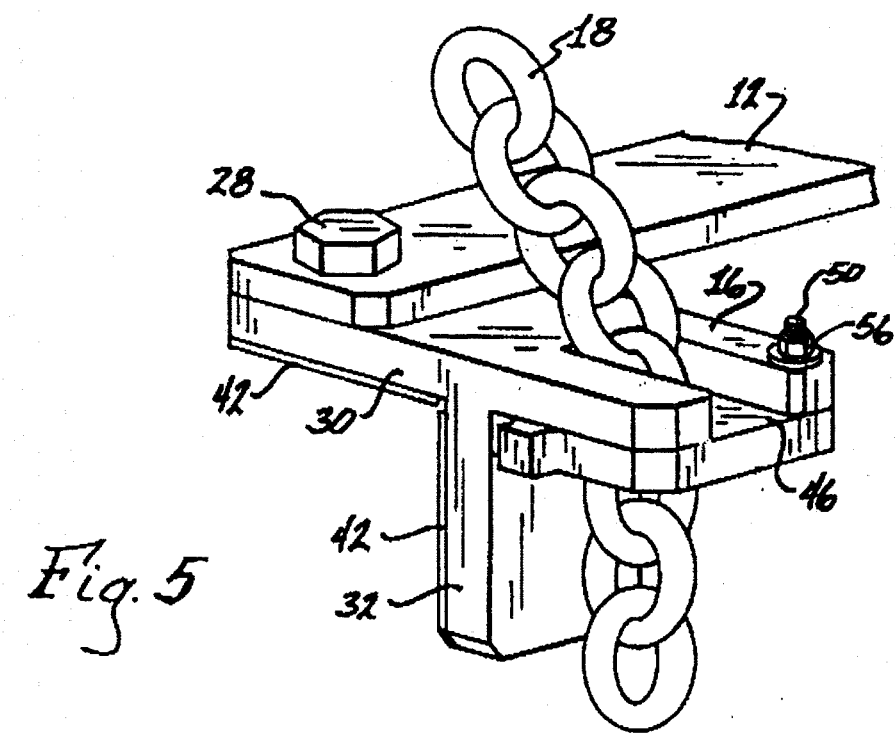
FIG. 5 is a perspective view of the engagement of a locking plate on a cleat.

When the chains 18 are almost completely tightened down, the optional locking plate 46 for each cleat 16 is pivoted so that the passage 52 in the locking plate 46 fits over the chain 18 as shown in FIG. 5. Once each locking plate 46 is in place, each chain 18 is tightened a little bit more to pull each locking plate 46 against each cleat 16. The passage 52 in the locking plate 46 is too small to allow the chain 18 to slip through.

The securing device 10 will substantially reduce, if not eliminate, accidents caused by objects 20 dislodging from the surface 22 they are secured to. An object 20 secured to a surface 22, such as a steel coil secured to the bed of a truck, will be held so securely that even during sharp turns the object 20 will not sway or dislodge. In fact in the example of the steel coil on the back of the truck, the entire truck will need to capsize before the steel coil could touch the ground.

Unlike prior devices and suggestions to secure objects 20 to a surface 22, such as the use of a large number of chains, the securing device 10 is very easy to use and can be installed by the operator in a manner of minutes. Additionally, the securing device 10 is substantially less expensive than other alternatives suggested for securing objects for transport or storage.

Having thus described the basic concept of the invention, it will be readily apparent to those skilled in the art that the foregoing detailed disclosure is intended to be presented by way of example only, and is not limiting. Various alterations, improvements and modifications will occur and are intended to those skilled in the art, though not expressly stated herein. These modifications, alterations, and improvements are intended to be suggested hereby, and are in the spirit and scope of the invention. Accordingly, the invention is limited only by the following claims and equivalents thereto.

What is claimed is:

1. An apparatus for securing an object to a surface with restraining elements comprising:

an elongated member having a pair of openings therein;

a pair of cleats pivotally connected to opposing ends of said elongated member, each of said cleats having a passage to receive one of said restraining elements, wherein each of said cleats further comprises:

a first portion containing said passage on one side thereof, and also having a first opening adjacent an opposing side;

a second portion extending substantially perpendicularly to said first portion and separating said passage from said first opening; and, a connector operatively arranged to pass through said first opening in said first portion and one of said pair of openings in said elongated member to pivotally secure said cleat to said elongated member.

2. An apparatus as recited in claim 1 wherein said first and second portions have perpendicularly adjacent faces operatively arranged to contact said object, and further comprising pads secured to said perpendicularly adjacent faces to protect said object from damage.

3. An apparatus for securing an object to a surface with restraining elements comprising:

a pair of brackets, where each bracket comprises a pair of cleats pivotally connected to opposing ends of an elongated member, said elongated member having a pair of openings therein, each of said cleats having a passage to receive one of said restraining elements, wherein each of said cleats further comprises:

a first portion containing said passage on one side thereof, and also having a first opening adjacent an opposing side;

a second portion extending substantially perpendicularly to said first portion and separating said passage from said first opening; and, a connector operatively arranged to pass through said first opening in said first portion and one of said pair of openings in a respective one of said elongated members to pivotally secure said cleat to said one elongated member.

4. An apparatus as recited in claim 3 wherein said first and second portions have perpendicularly adjacent faces operatively arranged to contact said object, and further comprising pads secured to said perpendicularly adjacent faces to protect said object from damage.

5. An apparatus as recited in claim 3 further comprising a locking plate pivotally secured to each of said cleats, and operatively arranged to lock a received one of said restraining elements to said cleat.

6. An apparatus as recited in claim 1 further comprising a tightening device to tighten each of said restraining elements.

7. A method for securing an object to a surface, comprising the steps of:

placing a first pair of cleats on the object, each of said first pair of cleats having a first passage, and said first pair of cleats pivotally connected to opposing ends of a rigid elongated member;

passing a first restraining element having a first end and a second end through the first passage in one of said first pair of cleats;

passing a second restraining element having a first end and a second end through the first passage in the other one of said first pair of cleats;

securing the first ends of said first and second restraining elements to the surface;

placing a second pair of cleats on the object, each of said second cleats having a second passage, and said second pair of cleats pivotally connected to opposing ends of a second rigid elongated member;

passing said first restraining element having a first end and a second end through the second passage in one of said second pair of cleats;

passing said second restraining element having a first end and a second end through the second passage in the other one of said second pair of cleats; and, securing the second ends of said first and second restraining elements to the surface.

8. The method according to claim 7 further comprising the steps of: locking said restraining elements in place in each of said cleats; and, tightening said restraining elements by increasing the tension thereof.

* * * * *